United States Patent [19]
Campbell et al.

[11] Patent Number: 5,546,672
[45] Date of Patent: Aug. 20, 1996

[54] MAGNETIC MARK DETECTION

[75] Inventors: Heather A. Campbell, Cambridge, Mass.; Terry L. Mayhugh, Round Rock, Tex.; Marvin W. Rasmussen; Guy Vachon, both of Austin, Tex.

[73] Assignee: Schlumberger Technology Corporation, Austin, Tex.

[21] Appl. No.: 337,332

[22] Filed: Nov. 9, 1994

[51] Int. Cl.$^6$ .................................................. G01B 7/26
[52] U.S. Cl. ............................... 33/716; 33/708; 33/719; 33/735; 33/739
[58] Field of Search ........................... 33/716, 715, 735, 33/773, 708, 719, 733, 736, 739, 750, DIG. 1

[56] References Cited

U.S. PATENT DOCUMENTS

| | | | |
|---|---|---|---|
| 3,566,478 | 3/1971 | Hurlston | 33/773 |
| 3,978,588 | 9/1976 | Richardson et al. | 33/719 |
| 4,179,817 | 12/1979 | Lavigne et al. | |
| 4,597,183 | 7/1986 | Broding | 33/719 |
| 4,718,168 | 1/1988 | Kerr | 33/735 |
| 4,924,596 | 5/1990 | Vachon. | |

*Primary Examiner*—Christopher W. Fulton
*Attorney, Agent, or Firm*—Charles D. Huston

[57] ABSTRACT

A method and apparatus for detecting magnetic marks on a wireline logging cable and for more accurately making depth measurements during logging is described. The method uses depth-based, rather than time-based, samples and calculations. A Hall Effect sensor samples the cable at regular depth intervals approximated by an encoder mechanism. The signal values from the Hall Effect sensor are signal processed to better discriminate the precise location of the magnetic marks on the cable. The location of the magnetic marks is used to refine the depth measurements from the encoder mechanism. Depth-based sampling eliminates detection dependence on cable speed, enhances detection ability, reduces computational load, and leads to more accurate determination of the location of magnetic marks.

19 Claims, 9 Drawing Sheets

MAGNETIC MARK DETECTION

BACKGROUND OF THE INVENTION

1. Field of the Invention

The present invention relates to a method and apparatus for detecting the location of magnetic marks on a wireline cable and for accurately making depth measurements during wireline logging.

2. Description of Related Art

One method in common use for providing a wireline depth measurement involves the use of encoder wheels which frictionally engage the cable or wireline to detect its movement. One such system is described in U.S. Pat. No. 4,179,817 (incorporated by reference). In this type of system, two encoder wheels are used for redundancy. As the cable moves, the wheels turn and, by counting the revolutions of the wheel, the distance the cable travels going into and out of the borehole can be measured. Such encoder wheels give an approximate estimate of cable distance travel or depth of the tools in the borehole.

U.S. Pat. No. 4,924,596 (incorporated by reference) describes a method for correcting slippage errors of such encoder wheels during wireline depth measurements. That is, wireline depth measurements are very important and U.S. Pat. No. 4,924,596 represents a method for more accurately obtaining depth measurements.

It is known to apply or impress magnetic marks to wireline cable at regular, precise intervals, for example 100 feet. See, U.S. Pat. No. 3,566,478 (incorporated by reference). The encoder wheel approximate depth measurements can be correlated to the magnetic mark location to give better depth assessments. The armor of a wireline cable is magnetized at periodic depths, either by a hand magnet or one of several electromagnetic marking coils. This magnetic mark is usually detected through a Hall Effect sensor. A mark signal looks significantly different depending on the method with which it was impressed. FIGS. 2A–B show the mark energy strength versus depth of various marking techniques. Note especially the large negative dip 30 on one side of the main peak on the AMD mark in FIG. 2A, and the substantial minor positive peak on the IDW mark in FIG. 2B.

The mark signal amplitude degrades as cable is moved through the well. This degradation is not uniform across the cable because the shallow end of the cable goes in and out of the well more often than the deeper end. After the mark signal has degraded so much that the mark can no longer be detected from noise, the cable marks must be refreshed (re-magnetized).

In the earliest mark detection systems, an analog peak detector was used to find energy peaks above a certain threshold—the location of such a peak was declared the location of a mark. Later systems implemented the same algorithm digitally by sampling the Hall Effect sensor at periodic time intervals, then taking the peak (above a threshold) of these samples.

Current approaches for detecting magnetic marks on a wireline cable have major problems. The most important difficulty is finding an appropriate threshold; the threshold must be above the noise, yet below the peak. Unfortunately, the amplitude of the peak changes as the mark slowly degrades and is consequently refreshed. Worse, the "false peak" part of an IDW mark (FIG. 2B) must be considered part of the noise, leading to a signal-noise ratio of sometimes less than 2. If the threshold is too high, the mark will be missed completely, yet if it is too low, two marks will be detected (or one mark if the second peak is ignored, but the mark will be found at different depths depending on whether the wireline cable is moving uphole or downhole). A wireline logging field engineer attempts to manually determine an appropriate threshold. The time-based sampling of the digital algorithm also causes a problem. Magnetic marks are usually about ten inches long; if a cable is moving fast enough, it is conceivable that a mark may be missed entirely. Cable speed affects the spectral content of these time-based samples, making the development of signal processing algorithms for magnetic mark detection difficult.

Thus, it would be a significant advance if a method and apparatus were devised for efficiently and accurately detecting the location of the magnetic marks on a wireline cable and integrating this magnetic mark detection with encoder wheel measurements for accurate depth determination. In the present application, depth of the logging tools within the borehole can be inferred from cable travel—therefore, "distance" and "depth" are sometimes used interchangeably. The signal strength detected by a Hall Effect sensor (e.g., FIG. 2) is sometimes referred to as a "signal value" or "signal level."

SUMMARY OF THE INVENTION

The problems are generally solved by the method and apparatus of the present invention. The method of detecting magnetic marks on a wireline cable uses depth-based, rather than time-based samples and calculations. Because the present invention uses depth-based, rather than time-based samples, the method for determining depth of a magnetic mark is independent of cable speed and advanced signal processing techniques can be used to more precisely determine the location of the magnetic marks on the cable.

Broadly speaking, the method of detecting the location of the magnetic marks impressed on a wireline cable at known distance intervals includes sampling the cable with a Hall Effect sensor at periodic distance intervals as the cable travels into and out of the borehole. The Hall Effect sensor detects an signal value for each sample at a respective distance interval and digitizes these signal values for processing. Preferably, the signal-noise ratio of these digitized signal values may be enhanced to more accurately determine the location of the magnetic mark.

The method also contemplates accurate wireline depth measurements using an encoder mechanism where the magnetic marks calibrate precisely the depth measurement. In this method, the wireline cable is sampled to detect magnetic marks at periodic depth intervals based upon approximate wireline depth measurements from an encoder mechanism. Once a location of a magnetic mark on the wireline is detected, the approximate wireline depth from the encoder mechanism is corrected to determine a more accurate wireline depth.

The system of the present invention for determining the depth of a wireline tool connected to a wireline cable includes an encoder mechanism at the surface which determines an approximate distance the cable has traveled into and out of the borehole. A Hall Effect sensor means proximate the wireline cable at the surface samples signal values at periodic distance intervals as the cable travels into and out of the borehole. A processor is coupled to the encoder mechanism and the Hall Effect sensor mechanism and receives signal sample values at the periodic distance intervals. These signal values are processed to increase the signal-noise ratio and a more precise location of the magnetic marks is determined. The location of the magnetic marks is used to adjust the approximate travel distance of the cable traversing the borehole. In a preferred form, the signal value samples are digitized, and the digital samples squared and summed with the peak denoting the location of the magnetic mark.

BRIEF DESCRIPTION OF THE DRAWINGS

FIG. 2A is a magnetic mark impressed by a hand magnet and FIG. 2B shows magnetic marks impressed by electromagnetic marking coils, AMD and IDW respectively;

FIG. 3A illustrates the concept and FIG. 3B illustrates the implementation of the preferred embodiment.

DESCRIPTION OF THE PREFERRED EMBODIMENT

Figure 1:
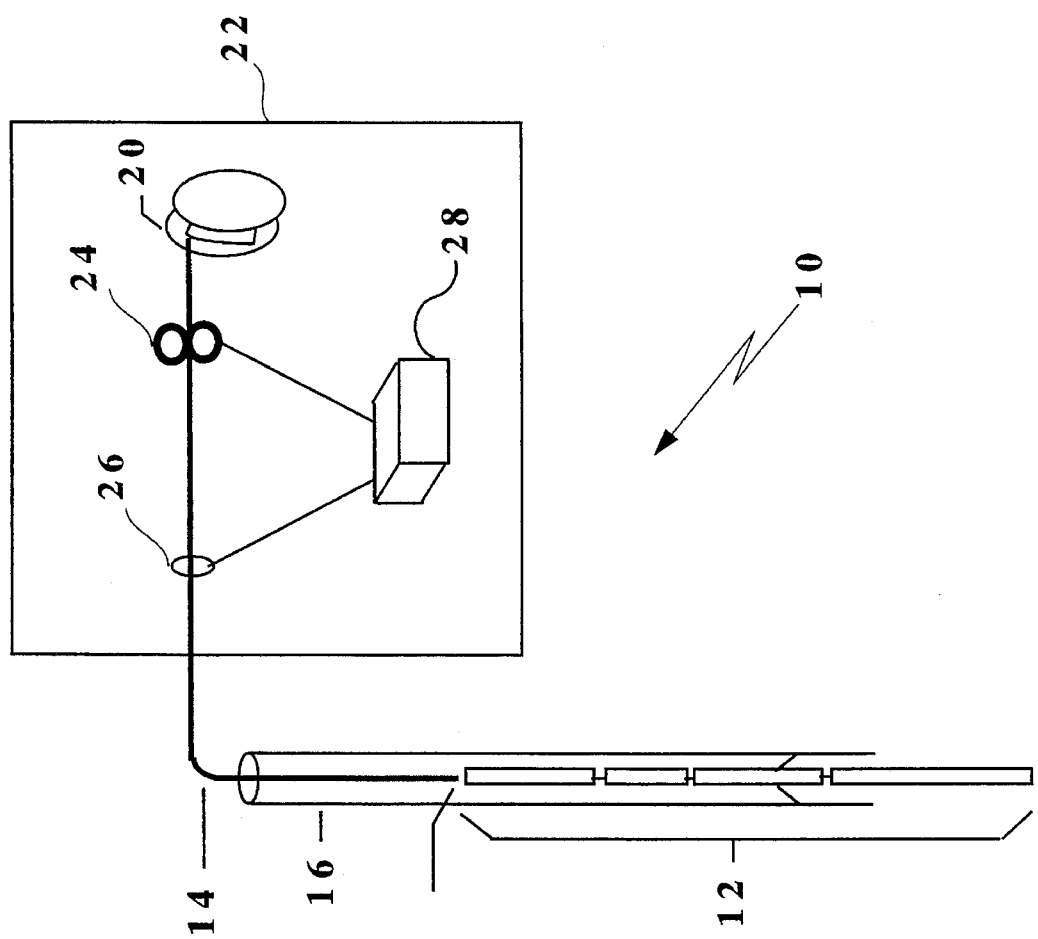
FIG. 1 is a schematic of a wireline acquisition system with tools connected to a wireline cable.

Turning to FIG. 1, a wireline acquisition system 10 schematically illustrates the context of the method and apparatus of the present invention. A plurality of wireline tools or tool string 12 is coupled to one end of a wireline logging cable 14 and lowered into the borehole 16. The other end of the wireline logging cable 14 is coupled to winch 20 which is part of the surface acquisition system 22. The winch 20 is operated by the wireline field engineer to raise and lower the tool string 12 into and out of the borehole 16.

An encoder mechanism 24 is shown in a juxtaposed location to the wireline logging cable 14 for approximately determining the distance of travel of the wireline cable, and hence an approximate depth of the tool string 12 in the borehole 16. In FIG. 1, the encoder mechanism 24 is schematically illustrated as two encoder wheels which frictionally engage the wireline logging cable, such as described in some detail in U.S. Pat. No. 4,179,817. Of course, other methods are available for determining approximate distance of wireline cable travel.

Figure 2A:
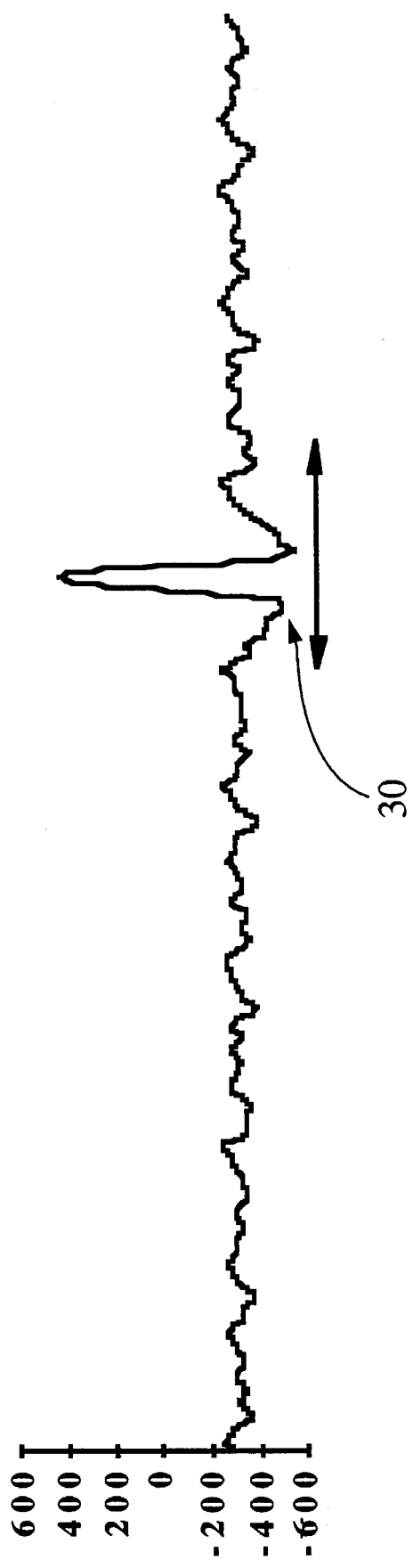
FIGS. 2A–2B are graphs showing magnetic mark signal strength versus depth where
Figure 2B:
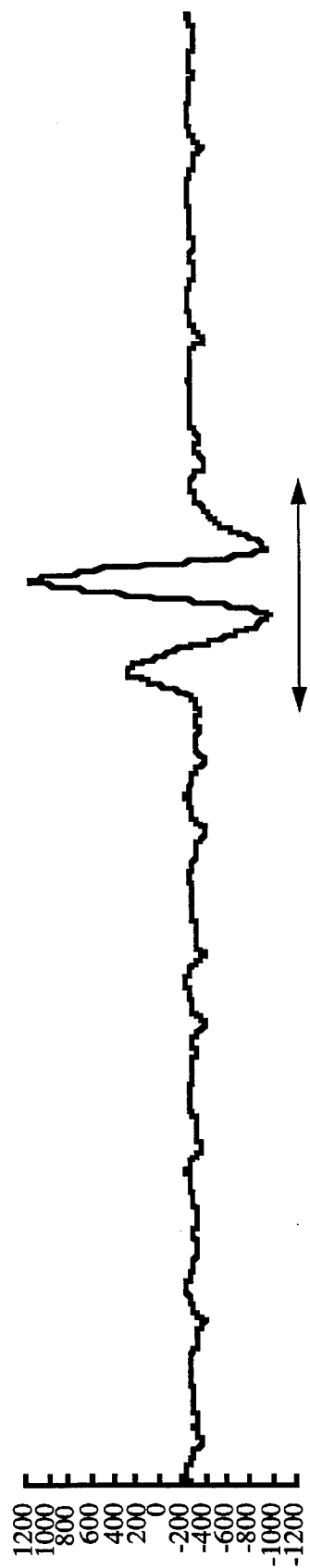

Although not illustrated in FIG. 1, the wireline cable 14 has impressed thereon magnetic marks at periodic intervals. In the United States these intervals are typically 100 feet and are typically impressed in the wireline cable armor by hand or electromagnetic coil methods, see e.g., FIGS. 2A–2B. To this end, a Hall Effect sensor 26 is positioned proximate the cable 14 for sensing the passage of a magnetic mark. As can be seen in FIG. 1, a processor 28 is also part of the surface acquisition system 22. The processor 28 receives an approximation of the tool depth derived from the distance measurements of the encoder mechanism 24. Additionally, the processor 28 is coupled to the Hall Effect sensor for receiving signal values. For purposes of illustration, the Hall Effect sensor mechanism 26 should be understood to include an analog to digital converter which converts the analog signals of the Hall Effect sensor to a digital value used by the processor 28. Such a processor is described in U.S. Pat. No. 5,483,232 and titled Method and Apparatus for Predicting Peak Voltage of a Cable Conveyed Tool (incorporated by reference).

In operation, the processor 28 receives signals from the encoder mechanism 24 as the cable 14 travels into and out of the borehole 16. The approximate depth intervals are passed through an analog to digital converter so that a digital value of the depth is used by the processor 28. In the preferred embodiment, the depth interval is every 0.1 of an inch. At each depth interval, the processor 28 commands operation of the Hall Effect sensor 26 to take a reading of an signal value. The signal value is digitized and used by the processor 28 which stores digital signal values as a function of approximate depth intervals.

Although the preferred embodiment presently samples continuously at every 0.1 of an inch depth interval, it will be appreciated that with magnetic marks every 100 feet, an acceptable alternative is to periodically sample within a depth window for magnetic marks. That is, based on the approximate depth measurements of encoder mechanism 24, the processor may command depth sampling in a window about the approximate 100 foot distance traveled from the last magnetic mark location. A range or window of perhaps several feet about the 100 foot expected depth location is believed adequate to detect the next magnetic mark.

Several possible methods could be used to determine the location of a magnetic mark on a wireline cable, such as: strict peak detection, peak detection of the sums of samples, peak detection of a matched filter correlation, or even spectral analysis. The preferred embodiment uses a signal processing technique where the signal value samples are squared and summed over a window of several such squared samples (to yield an energy rate). The location of the peak of the energy value, above a threshold, is considered to be the location of the magnetic mark on the cable. The accumulation window needs to be large enough that the "false peaks" and negative dips contribute to the energy signal. The number of points in the window cannot be too large, however, because the larger the window, the greater the distance between the energy peak of the mark signal and the depth at which the mark is detected. A limit must be placed on this distance latency if the mark is to be refreshed. Setting the window threshold is relatively simple with the present method because the signal-noise ratio of the energy signal is significantly larger than the signal-falsepeak ratio of the pure magnetic signal.

Figure 3A:
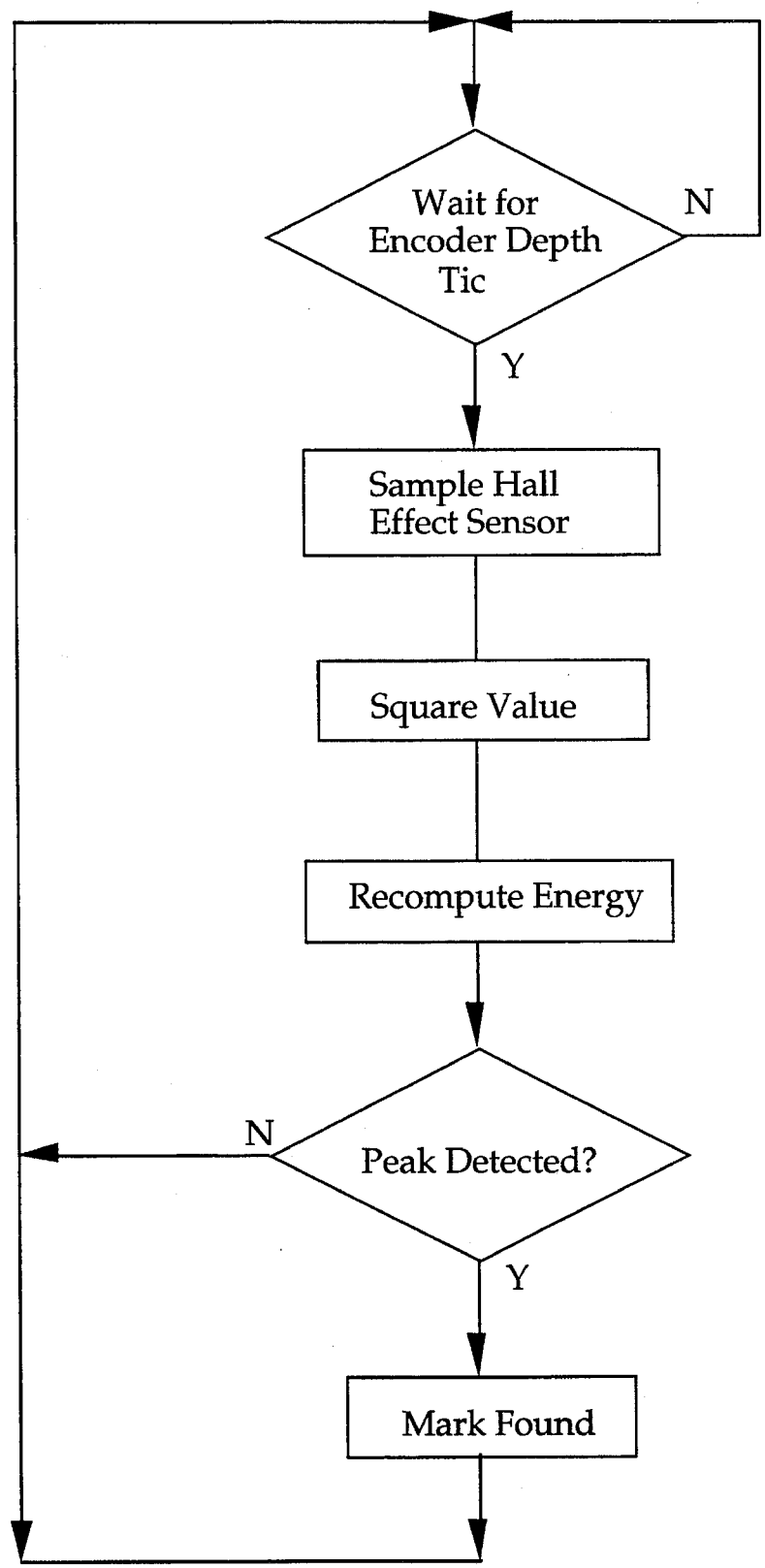
FIGS. 3A–3B are flowcharts depicting the method for signal processing the signal values of the magnetic mark's strength where
Figure 3B:
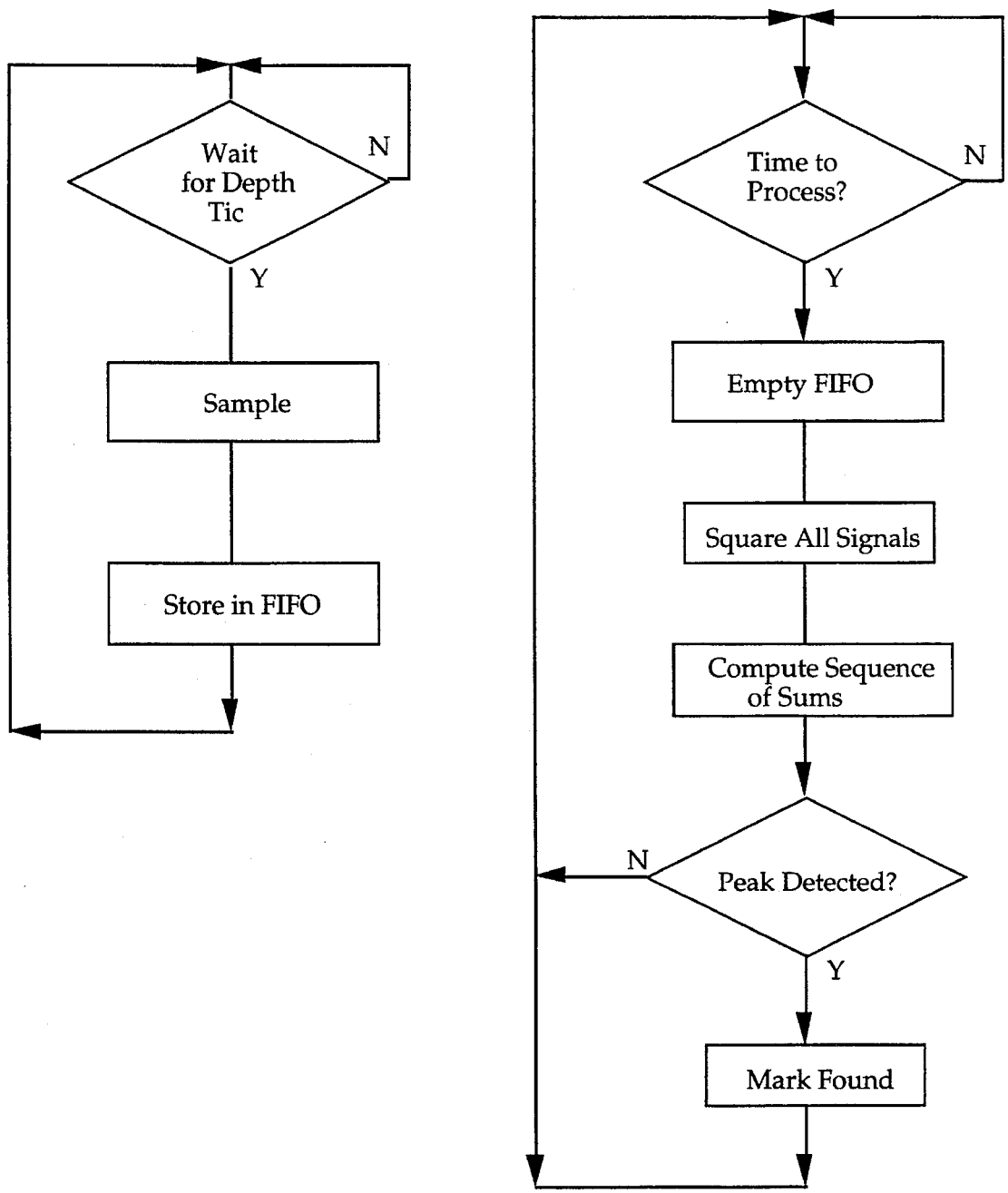
Figure 4A:
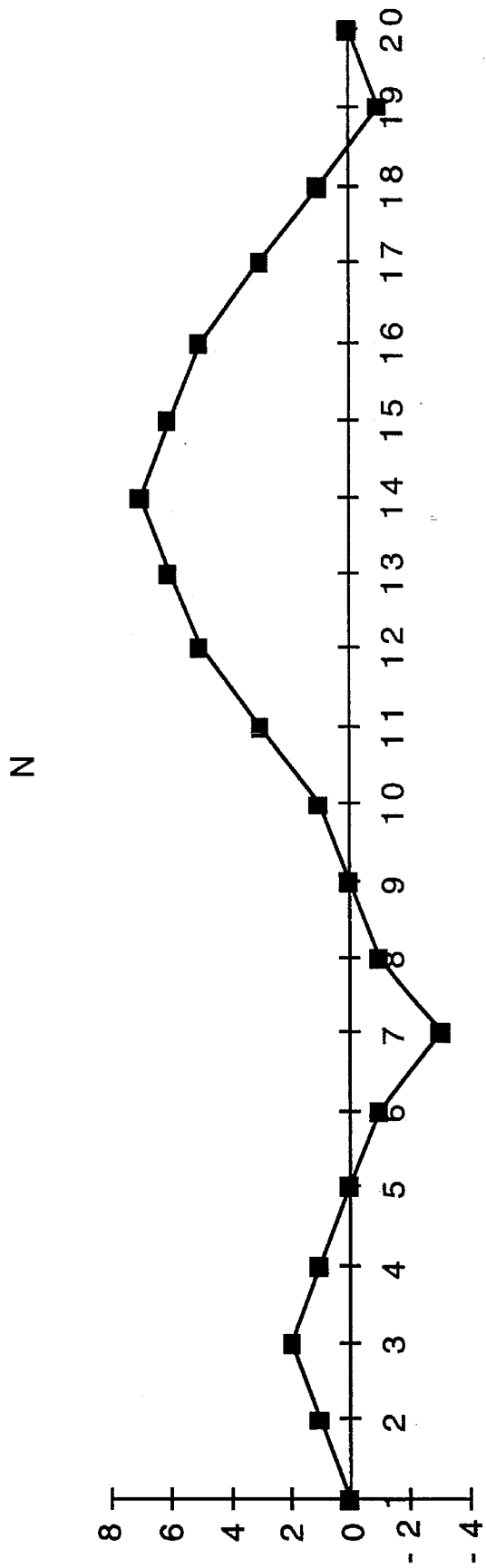
FIGS. 4A–4D are graphs showing the results of an exemplary processing procedure of magnetic mark signal values.
Figure 4B:
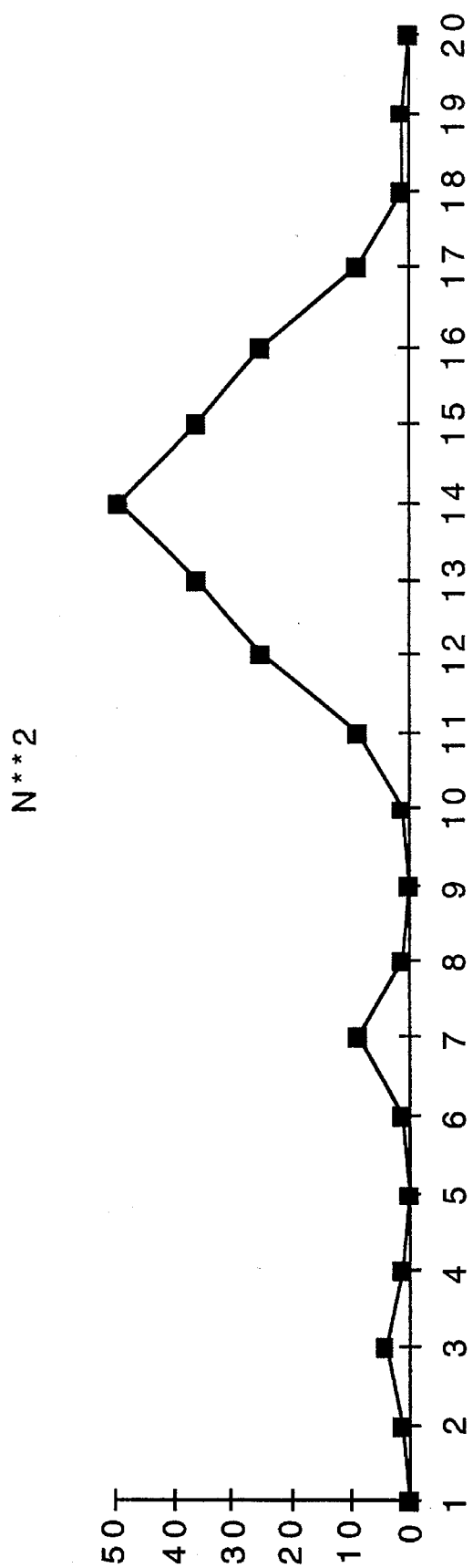
Figure 4C:
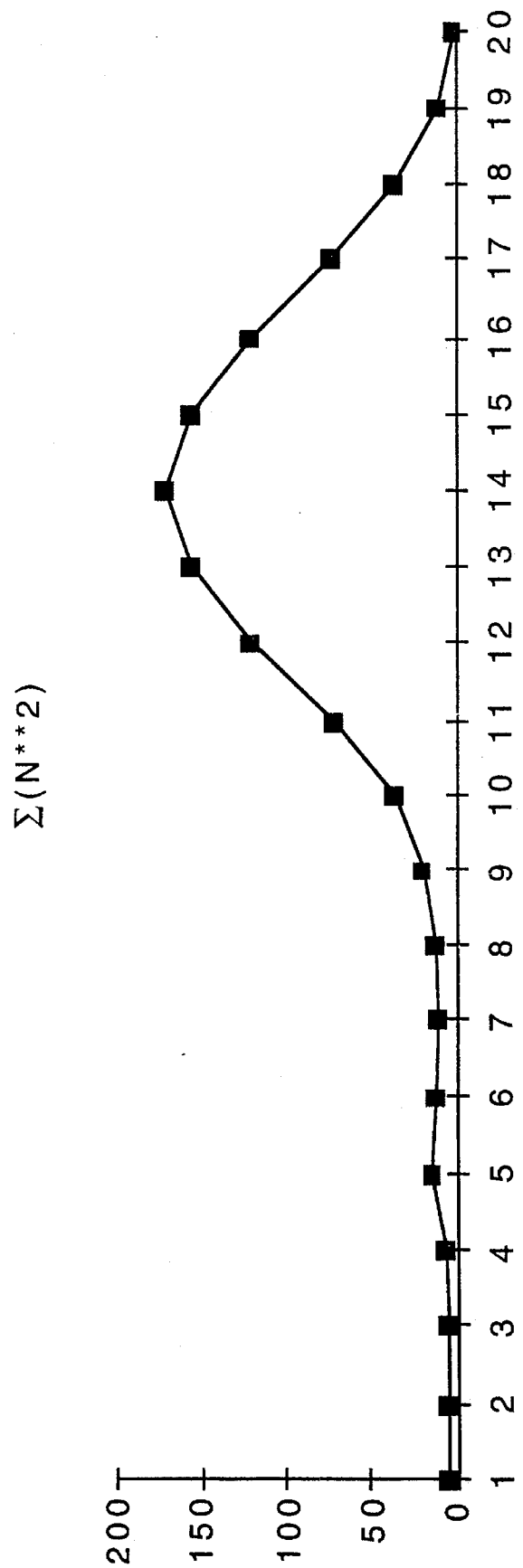
Figure 4D:
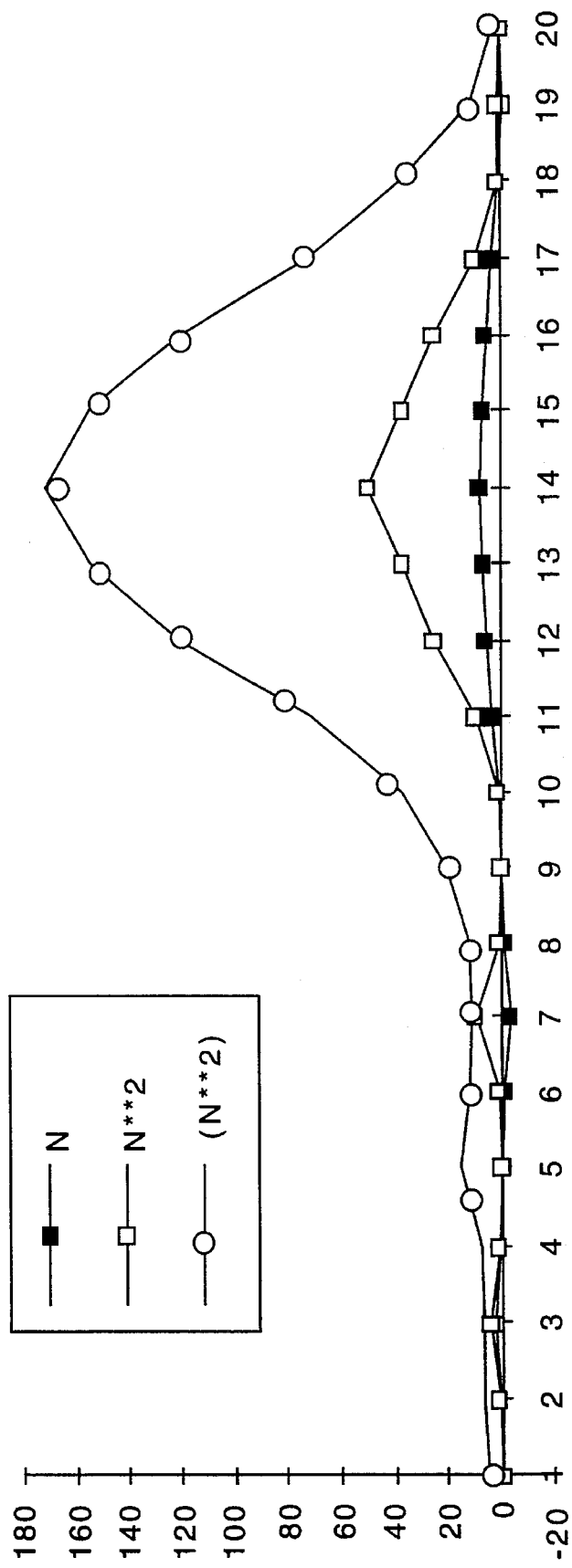

In more detail, the processor 28 receives digital energy samples at periodic depth intervals as shown in FIG. 4A. The processor 28 squares these samples and the result is shown in FIG. 4B. Further signal processing is made in FIG. 4C where the processor 28 sums the samples in a window about each sample. To illustrate, consider the sample at depth interval 12 in FIG. 4B. The window of 2 samples below and 2 samples above the sample at interval 12 is made—that is, samples at intervals 10, 11, 12, 13, and 14 are summed. The resulting sum is the new value of the sample interval 12 illustrated in FIG. 4C. FIG. 4D shows a comparison of the signal processing results. As can be seen, the sample at depth interval 14 is the peak and is taken as the location of the magnetic mark. FIG. 3A is a flowchart illustrating the concept of the method of processing, while FIG. 3B is a flowchart illustrating the implementation of the preferred embodiment.

After determining the magnetic mark location, the processor 28 then takes the approximate depth value from the encoder mechanism 24 and corrects based on magnetic mark location. For example, if the magnetic mark location is detected at the approximate depth value equal to 99.4 feet from the previous magnetic mark, and it is known that magnetic marks occur every 100 feet, the true depth is adjusted 0.6 of a foot to achieve a more accurate depth location.

Use of the magnetic mark location may be operationally driven. That is, as described above the preferred embodiment contemplates automatic correction of encoder depth every time a magnetic mark is detected by the present method. Alternatively, the field engineer may be presented with the option of making the correction based on magnetic mark detection or keeping the encoder depth as the indication of the depth of the tool in the borehole.

We claim:

1. A method of detecting the location of magnetic marks impressed at predetermined lengths on a wireline cable as the cable traverses a borehole, comprising the steps of:

sampling the wireline cable with a Hall Effect sensor at periodic distance intervals substantially less than the predetermined lengths as the cable traverses the borehole to obtain a plurality of samples at the approximate location of a magnetic mark;

detecting an analog signal value for each sample;

digitizing said plurality of analog signal values;

processing said digitized signal values to discriminate between signal and noise; and determining which processed digitized signal values are indicative of a magnetic mark.

2. The method of claim 1, said periodic distance intervals being determined by an encoder mechanism frictionally engaging the cable to measure an approximate distance of cable travel.

3. The method of claim 1, said sampling step including operating said Hall Effect sensor at a distance interval of 0.1 foot of cable travel.

4. The method of claim 1, said cable having magnetic mark locations every 100 feet, said Hall Effect sensor being operable in a window every 100 foot of cable travel at 0.1 foot intervals.

5. The method of claim 1, said processing step including squaring the digitized signal values.

6. The method of claim 5, including for each squared signal value, summing a window of values proximate said squared value, and using the peak summation as the location of the magnetic mark.

7. The method of claim 6, including the step of using the location of the magnetic mark to refine the distance said cable has traveled.

8. The method of claim 1, the distance between successive marks being known, including the steps of determining the approximate distance of cable travel using an encoder mechanism frictionally engaging said cable, and adjusting said approximate distance using magnetic mark location.

9. The method of claim 8, said adjusting step comprising determining a difference between the approximate distance of cable travel between marks and the known distance between marks, and adjusting the approximate distance with said difference.

10. A system for determining the depth of a wireline tool connected to a wireline cable traversing a borehole and having magnetic marks with known distances between successive marks comprising:

encoder means at the surface for determining the approximate distance the cable has traveled;

Hall Effect sensor means coupled to said encoder means and proximate said cable at the surface for taking sample signal values at periodic distance intervals as the cable travels;

processor means coupled to said Hall Effect sensor means for receiving said signal values, for increasing the signal to noise ratio of said signal values, for determining when said signal values are indicative of a magnetic mark, and for adjusting said approximate distance of cable travel to a corrected distance.

11. The method of claim 10, said encoder means comprising an encoder wheel frictionally and rotationally engaging said cable and having a known diameter for indicating approximate distance of cable travel.

12. The method of claim 10, said Hall Effect sensor being coupled to said encoder means through said processor means, said processor receiving approximate distance of cable travel from said encoder means and said processor initiating said Hall Effect sensor operation at said periodic distance intervals.

13. The method of claim 10, said processor means for additionally determining a depth of said wireline tool in said borehole based on said corrected distance of cable travel.

14. A method for computing an accurate wireline depth measurement in a borehole using an encoder mechanism engaging a wireline cable traversing the borehole, said cable having magnetic marks impressed thereon, comprising the steps of:

determining an approximate wireline depth using said encoder mechanism;

sampling the wireline to determine signal values at periodic depth intervals based on said approximate wireline depth;

detecting a magnetic mark location on the wireline using said signal values including collecting a plurality of samples from said sampling step, processing the samples to enhance the signal to noise ratio of the samples, determining whether a sample constitutes a magnetic mark; and correcting said approximate wireline depth with said magnetic mark locations to determine an accurate wireline depth.

15. The method of claim 14, said encoder mechanism including a wheel said determining step including the substeps of engaging the wireline cable with said encoder wheel and outputting an approximate wireline depth based on rotation of said encoder wheel as said wireline cable traverses the borehole.

16. The method of claim 14, said sampling step including the substeps of positioning a Hall Effect sensor proximate the wireline cable, receiving approximate depth measurements from said encoder mechanism, and operating said Hall Effect sensor at periodic depth intervals to determine signal values on said wireline cable.

17. The method of claim 14, said detecting step including collecting samples at periodic depth intervals where the distance of the periodic depth intervals are less than the distance between magnetic marks impressed on the wireline cable.

18. The method of claim 14, said processing substep including squaring the samples, summing the squared samples over a range of samples, and denoting the peak sample over a threshold energy value as a magnetic mark location.

19. The method of claim 14, the distance between magnetic mark locations being known, said correcting step including storing said approximate wireline depth, comparing said approximate wireline depth to said magnetic mark location, and adjusting said stored wireline depth to coincide with said known distance between magnetic mark locations.

* * * * *

UNITED STATES PATENT AND TRADEMARK OFFICE
CERTIFICATE OF CORRECTION

PATENT NO. : 5,546,672

DATED : August 20, 1996

INVENTOR(S) : Campbell et al

It is certified that error appears in the above-identified patent and that said Letters Patent is hereby corrected as shown below:

In claim 11, column 6, line 1, change "method" to --system--.
In claim 12, column 6, line 1, change "method" to --system--.
In claim 13, column 6, line 1, change "method" to --system--.

Signed and Sealed this

Thirty-first Day of December, 1996

Attest:

BRUCE LEHMAN

*Attesting Officer*     *Commissioner of Patents and Trademarks*